(12) United States Patent
Weber et al.

(10) Patent No.: US 6,918,958 B2
(45) Date of Patent: Jul. 19, 2005

(54) ACID PIGMENT DISPERSANTS AND PIGMENT PREPARATIONS

(75) Inventors: Joachim Weber, Frankfurt am Main (DE); Gerhard Wilker, Moerfelden-Walldorf (DE); Klaus Brychcy, Frankfurt am Main (DE); Erwin Dietz, Koenigstein (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/467,578

(22) PCT Filed: Jan. 31, 2002

(86) PCT No.: PCT/EP02/00979

§ 371 (c)(1),
(2), (4) Date: Aug. 8, 2003

(87) PCT Pub. No.: WO02/064680

PCT Pub. Date: Aug. 22, 2002

(65) Prior Publication Data

US 2004/0060478 A1 Apr. 1, 2004

(30) Foreign Application Priority Data

Feb. 10, 2001 (DE) .......... 101 06147

(51) Int. Cl.⁷ .......... C09B 67/22; C09B 67/20
(52) U.S. Cl. .......... 106/493; 106/410; 106/411; 106/412; 106/413; 106/494; 106/495; 106/496; 106/497; 106/498; 106/499; 106/31.75; 524/81; 524/82; 524/83; 524/84; 524/86; 524/87; 524/88; 524/96; 524/98; 524/99; 524/100; 524/102; 524/104; 524/105; 524/106; 524/107; 524/108; 524/109; 524/110; 524/168
(58) Field of Search .......... 106/31.75, 410, 106/411, 412, 413, 493, 494, 495, 496, 497, 498, 499; 524/81, 82, 83, 84, 86, 87, 88, 96, 98, 99, 100, 102, 104, 105, 106, 107, 108, 109, 110, 168

(56) References Cited

U.S. PATENT DOCUMENTS

| | | | |
|---|---|---|---|
| 4,310,359 A | 1/1982 | Ehashi et al. | 106/288 |
| 4,759,801 A | 7/1988 | Goldmann et al. | 106/502 |
| 4,762,569 A * | 8/1988 | Miki et al. | 106/476 |
| 4,766,153 A | 8/1988 | Casciani | 514/785 |
| 4,791,204 A | 12/1988 | Jost et al. | 548/101 |
| 4,838,943 A | 6/1989 | Bitterli et al. | 106/400 |
| 4,914,211 A | 4/1990 | Jost et al. | 548/453 |
| 5,021,573 A | 6/1991 | Bitterli et al. | 544/284 |
| 5,071,482 A * | 12/1991 | Dietz et al. | 106/498 |
| 5,106,960 A | 4/1992 | Hurter et al. | 534/845 |
| 5,176,750 A | 1/1993 | Kammer et al. | 106/496 |
| 5,264,034 A | 11/1993 | Dietz et al. | 106/493 |
| 5,274,126 A | 12/1993 | Röhrscheid et al. | 549/241 |
| 5,300,148 A | 4/1994 | Domingo et al. | 106/498 |
| 5,304,244 A | 4/1994 | Goldmann et al. | 106/493 |
| 5,430,152 A | 7/1995 | Saukaitis et al. | 546/153 |
| 5,472,494 A | 12/1995 | Hetzenegger et al. | 106/493 |
| 5,488,111 A | 1/1996 | Saukaitis | 546/156 |
| 5,501,710 A | 3/1996 | Wunderlich | 8/402 |

(Continued)

FOREIGN PATENT DOCUMENTS

| | | |
|---|---|---|
| DE | 29 16 484 | 11/1980 |
| EP | 0 039 306 | 11/1981 |
| EP | 0 147 364 | 7/1985 |
| EP | 0 224 445 | 6/1987 |
| EP | 0 636 666 | 7/1993 |
| EP | 0 649 881 | 4/1995 |
| EP | 0 719 847 | 7/1996 |
| EP | 1 026 207 | 8/2000 |
| GB | 1 429 177 | 3/1976 |
| GB | 2 025 954 | 1/1980 |
| GB | 2 071 683 | 9/1981 |
| JP | 57 059 969 | 4/1982 |
| JP | 57 141 456 | 9/1982 |
| JP | 58 052 360 | 3/1983 |
| JP | 62 253 662 | 11/1987 |
| JP | 10 088 505 | 4/1989 |
| JP | 11 190 770 | 7/1989 |
| JP | 03 026 767 | 2/1991 |
| JP | 08 029 777 | 2/1996 |
| WO | WO 91/02034 | 2/1991 |

OTHER PUBLICATIONS

J.F. Hughes, "Electrostatics Powder Coating" Research Studies, John Wiley & Sons, 1984), (no month).

*Primary Examiner*—Anthony J. Green
(74) *Attorney, Agent, or Firm*—Anthony A. Bisulca

(57) ABSTRACT

The invention relates to pigment dispersants of the formula (I), and to pigment preparations including at least one organic pigment and at least one pigment disperant of the formula (I):

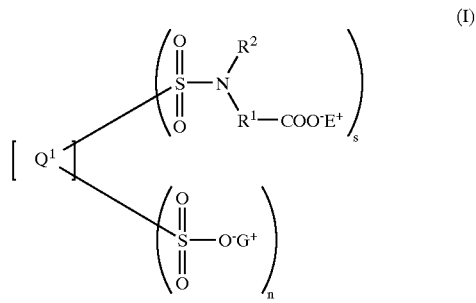

wherein $Q^1$, $R^1$, $R^2$, $E^+$, $G^+$, s and n are defined in the specification.

18 Claims, No Drawings

U.S. PATENT DOCUMENTS

| | | | |
|---|---|---|---|
| 5,504,246 A | 4/1996 | Likibi et al. | 562/540 |
| 5,610,318 A | 3/1997 | Jaekel et al. | 548/479 |
| 5,648,521 A | 7/1997 | Löffler | 562/3 |
| 5,670,685 A | 9/1997 | Likibi et al. | 556/437 |
| 5,693,842 A | 12/1997 | Kleiner et al. | 558/82 |
| 5,698,618 A | 12/1997 | Kamikubo et al. | 524/88 |
| 5,704,969 A | 1/1998 | Kanaya et al. | 106/31.48 |
| 5,705,603 A | 1/1998 | Krull et al. | 528/332 |
| 5,712,414 A | 1/1998 | Dierdorf et al. | 564/138 |
| 5,718,821 A | 2/1998 | Krull et al. | 208/24 |
| 5,910,577 A | 6/1999 | Metz et al. | 534/742 |
| 6,126,736 A | 10/2000 | Stoll et al. | 106/506 |
| 6,194,493 B1 | 2/2001 | Stährfeldt et al. | 524/87 |
| 6,204,420 B1 | 3/2001 | Miller et al. | 585/4 |
| 6,228,380 B1 | 5/2001 | LeGrow et al. | 424/401 |
| 6,239,081 B1 | 5/2001 | Korzilius et al. | 507/145 |
| 6,290,768 B1 | 9/2001 | Metz et al. | 106/493 |
| 6,326,514 B1 | 12/2001 | Klug et al. | 562/583 |
| 6,375,732 B1 | 4/2002 | Kaul et al. | 106/494 |
| 6,482,817 B1 | 11/2002 | Kaul et al. | 514/185 |
| 6,521,756 B2 | 2/2003 | Weber et al. | 546/37 |
| 6,555,604 B1 | 4/2003 | Sidqi | 524/103 |
| 6,559,306 B2 | 5/2003 | Kaul et al. | 544/233 |
| 6,562,121 B2 | 5/2003 | Nickel et al. | 106/493 |
| 6,638,996 B1 | 10/2003 | Kaul et al. | 524/87 |
| 6,646,126 B2 | 11/2003 | Weber et al. | 546/37 |

\* cited by examiner

ACID PIGMENT DISPERSANTS AND PIGMENT PREPARATIONS

The present invention relates to novel pigment dispersants and novel pigment preparations having improved coloristic and rheological properties and also to their preparation and use for pigmenting high molecular mass materials.

Pigment preparations are combinations of pigments and pigmentary dispersing agents, the latter being referred to below as pigment dispersants. These pigment dispersants are structurally analogous to pigments and are prepared, for example, from substances of pigmentary character, preferably from the organic pigments themselves, by substitution by groups having a specific activity. The dispersants are added to the pigments in order to facilitate their dispersion in the application media, especially in varnishes, and to improve the rheological and coloristic properties of the pigments. The viscosity of the highly pigmented paint concentrates (millbase) is lowered and the flocculation of the pigment particles reduced. This makes it possible, for example, to enhance the transparency and gloss. Such enhancement is particularly desirable in the case of metallic pigments.

There are a large number of proposals for improving the rheological and coloristic properties of organic pigments by adding pigmentary or nonpigmentary auxiliaries, but they do not always lead to the result hoped for.

JP 08 029 777 and JP 01 088 505 disclose water-soluble dyes with carboxyl groups based on Zn phthalocyanines, while JP 62 253 662, JP 01 190 770, EP 649 881, and EP 719 847 disclose water-soluble dyes with carboxyl groups based on Cu phthalocyanines. GB 1 429 177, DE 29 16 484, EP 39 306, and JP 57 059 969 disclose water-soluble azo dyes with carboxyl groups. Dyes are colorants which are soluble in the application medium and therefore carry correspondingly solubilizing groups, in contrast to pigments, which are not soluble in the application medium. Water-soluble dyes are not suitable, for example, for pigmenting water-based paint systems, since their fastness properties such as solvent fastness or fastness to overcoating are inadequate.

GB 2 025 954 and EP 147 364 disclose water-soluble substances with carboxyl groups based on anthraquinone for wastewater treatment, while JP 58-52360 discloses anthraquinone-derived compounds with carboxyl groups.

U.S. Pat. No. 5,698,618 describes pigment dispersants with free sulfonic acid groups. EP 1 026 207 discloses pigment dispersants with free sulfonic acid or carboxyl groups. EP-A-224 445 describes pigment dispersants with sulfonic acid or carboxyl groups. The pigment preparations produced with these pigment dispersants, however, do not meet all of the requirements imposed on pigment preparations in respect of the performance properties.

There was a need for improvement, and, accordingly, the object was to find pigment dispersants which are readily available for the various classes of pigment, which can be employed universally with the various classes of pigment, and through whose use novel pigment preparations can be provided which in comparison with the state of the art have superior properties.

It has been found that the object is achieved, surprisingly, by carboxyl-containing pigment dispersants defined below.

The invention provides pigment dispersants of the general formula (I)

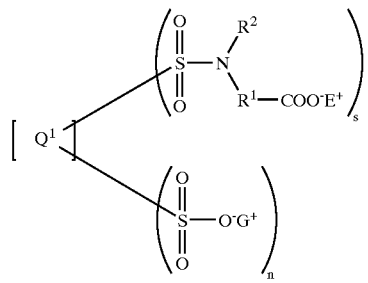

in which $Q^1$ is a radical of an organic pigment from the group of the perinone, quinacridone, quinacridonequinone, anthanthrone, indanthrone, dioxazine, such as triphendioxazines, for example, diketopyrrolopyrrole, indigo, thioindigo, thiazineindigo, isoindoline, isoindolinone, pyranthrone, isoviolanthrone, flavanthrone or anthrapyrimidine pigments;

s is a number from 1 to 5;

n is a number from 0 to 4;

the sum of s and n being from 1 to 5;

$R^1$ is a divalent branched or unbranched, saturated or unsaturated, aliphatic hydrocarbon radical having 1 to 20 carbon atoms, or a $C_5$–$C_7$-cycloalkylene radical, or a divalent aromatic radical having 1, 2 or 3, preferably 1 or 2, aromatic rings, it being possible for the rings to be in fused form or to be linked by a bond, such as, for example, a phenyl, biphenyl or naphthyl radical, or a heterocyclic radical having 1, 2 or 3 rings which contains 1, 2, 3 or 4 heteroatoms from the group O, N, and S, or a combination thereof; it being possible for the aforementioned hydrocarbon, cycloalkylene, aromatic and heteroaromatic radicals to be substituted by 1, 2, 3 or 4 substituents from the group OH, CN, F, Cl, Br, $NO_2$, $CF_3$, $C_1$–$C_6$-alkoxy, S—$C_1$–$C_6$-alkyl, $NHCONH_2$, $NHC(NH)NH_2$, NHCO—$C_1$–$C_6$-alkyl, $C_1$–$C_6$-alkyl, $COOR^{20}$, $CONR^{20}R^{21}$, $NR^{20}R^{21}$, $SO_3R^{20}$ or $SO_2$—$NR^{20}R^{21}$, $R^{20}$ and $R^{21}$ being identical or different and being hydrogen, phenyl or $C_1$–$C_6$-alkyl;

$R^2$ is hydrogen, $HR^1$ or $R^1$—$COO^-E^+$;

$E^+$ and $G^+$ independently of one another are $H^+$ or the equivalent $M^{m+}/m$ of a metal cation $M^{m+}$ from main groups 1 to 5 or transition groups 1 or 2 or 4 to 8 of the periodic system of the chemical elements, m being 1, 2 or 3, such as, for example, $Li^{1+}$, $Na^{1+}$, $K^{1+}$, $Mg^{2+}$, $Ca^{2+}$, $Sr^{2+}$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; an ammonium ion $N^+R^9R^{10}R^{11}R^{12}$, where the substituents $R^9$, $R^{10}$, $R^{11}$ and $R^{12}$ independently of one another are each a hydrogen atom, $C_1$–$C_{30}$-alkyl, $C_2$–$C_{30}$-alkenyl, $C_5$–$C_{30}$-cycloalkyl, phenyl, ($C_1$–$C_8$)-alkyl-phenyl, ($C_1$—$C_4$)-alkylene-phenyl, such as benzyl, or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$–$C_4$-alkyl or, if k is >1, a combination thereof;

and in which alkyl, alkenyl, cycloalkyl, phenyl or alkylphenyl $R^9$, $R^{10}$, $R^{11}$, and/or $R^{12}$ may be substituted by amino, hydroxyl and/or carboxyl;

or where the substituents $R^9$ and $R^{10}$, together with the quaternary nitrogen atom, are able to form a five- to seven-membered saturated ring system containing, if desired, further heteroatoms from the group consisting of O, S and N, said system being, for example, of the pyrrolidone, imidazolidine, hexamethyleneimine, piperidine, piperazine or morpholine type;
or where the substituents $R^9$, $R^{10}$ and $R^{11}$, together with the quaternary nitrogen atom, are able to form a five- to seven-membered aromatic ring system, containing, if desired, further heteroatoms from the group consisting of O, S and N, and to which additional rings may be fused if desired, said ring system being, for example, of the pyrrole, imidazole, pyridine, picoline, pyrazine, quinoline or isoquinoline type; or in which $E^+$ and/or $G^+$ defines an ammonium ion of the formula (Ia)

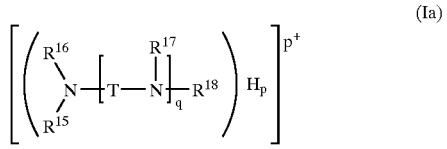

in which
$R^{15}$, $R^{16}$, $R^{17}$ and $R^{18}$ independently of one another are hydrogen or a (poly)alkyleneoxy group of the formula —[CH($R^{80}$)—CH($R^{80}$)O]$_k$—H, in which k is a number from 1 to 30 and the two radicals $R^{80}$ independently of one another are hydrogen, $C_1$–$C_4$-alkyl or, if k is >1, a combination thereof;
q is a number from 1 to 10, preferably 1, 2, 3, 4 or 5;
p is a number from 1 to 5, where p is $\leq$q+1;
T is a branched or unbranched $C_2$–$C_6$-alkylene radical; or in which T, if q is >1, may also be a combination of branched or unbranched $C_2$–$C_6$-alkylene radicals.

Preferred radicals $Q^1$ of an organic pigment for the purposes of the present invention are for example C.I. Pigment Yellow 108, 109, 110, 138, 139, 173, 185; Pigment Orange 42, 43, 48, 49, 61, 71, 73; Pigment Red 88, 122, 168, 192, 194, 202, 206, 207, 209, 254, 255, 264, 272; Pigment Violet 19, 23, 37.

Of particular interest are pigment dispersants of the formula (I) where s=1 to 3, n=0 to 2, and the sum of s and n is from 1 to 3. Particularly of interest are pigment dispersants of the formula (I) where s=1 to 2.5, n=0 to 1, and the sum of s and n is from 1 to 2.5.

Further of particular interest are pigment dispersants of the formula (I) in which $R^1$ is a branched or unbranched $C_1$–$C_{10}$-alkylene group, especially ethylene, propylene or butylene, or a phenylene radical.

Also of particular interest are pigment dispersants of the formula (I) in which $R^2$ is hydrogen or $C_1$–$C_6$-alkyl, especially H, methyl or ethyl.

Additionally of particular interest are pigment dispersants of the formula (I) in which $E^+$ and $G^+$ have the definition $H^+$ or $Na^+$, or in which, in the case of the equivalent $M^{m+}/m$, the metal cation M has the definition $Ca^{2+}$, $Sr^{2+}$, $Ba^{2+}$ or $Al^{3+}$.

The pigment dispersants of the invention may be prepared by chlorosulfonating organic pigments from the group of the perinone, quinacridone, quinacridonequinone, anthanthrone, indanthrone, dioxazine, such as triphendioxazines, for example, diketopyrrolopyrrole, indigo, thioindigo, thiazineindigo, isoindoline, isoindolinone, pyranthrone, isoviolanthrone, flavanthrone or anthrapyrimidine pigments, reacting the sulfochloride with an aminocarboxylic acid of the formula (V)

in which $R^1$ and $R^2$ are as defined above, and, if desired, reacting or laking the free acid with an ammonium salt or metal salt based on $G^+$ or $E^+$.

As aminocarboxylic acids of the general formula (V) it is possible to use for example α-, β-, γ-, δ-, ε-aminocarboxylic acids, such as glycine, methylglycine, sarcosine, aminopropionic acids, such as α-, and β-alanine or 3-amino-3-phenylpropionic acid, valine, leucine, isoleucines, cycloleucine, tryptophan, histidine, serine, isoserine, threonine, methionine, ornithine, arginine, citrulline, lysine, asparagines, aspartic acid, glutamine, glutamic acid, phenylalanine and substituted phenylalanines, such as tyrosine or dopa, proline, 1-aminocyclohexanecarboxylic acid, aminobutyric acids, such as 1,3-diaminobutyric acid, aminovaleric acids, 5-aminolavulic acid, aminocaproic acids, 2-aminoadipic acid, 2,6-diaminopimelic acid, aminocaprylic acid, substituted or unsubstituted aminobenzoic acids, such as m- or p-aminobenzoic acid, p-aminosalicylic acid, aminoisophthalic acid or aminoterephthalic acid.

The chlorosulfonation is appropriately conducted using chlorosulfonic acid in a 4 to 40-fold weight excess, based on the pigment, and preferably further using from 1 to 20 times, preferably from 1 to 10 times, the molar amount, based on the pigment, of thionyl chloride. The chlorosulfonation is preferably conducted at a temperature of from −10 to 200° C., in particular at from 0 to 150° C., where appropriate under pressure. The sulfochloride of the pigment is appropriately precipitated from water and isolated.

The reaction of the sulfochloride with the aminocarboxylic acid takes place at a temperature of from −15 to 100° C., in particular at from −5 to 80° C., and preferably in an aqueous medium. The molar amounts of aminocarboxylic acids to sulfochloride are appropriately (0.5 to 15):1, preferably (0.5 to 10:1), in particular (1 to 5):1. It is preferred to start with the aminocarboxylic acid in water and to add the sulfochloride. It is advantageous to neutralize the initial aminocarboxylic acid charge with a base before adding the sulfochloride, so that the aminocarboxylic acid is in the aminocarboxylate form. For this purpose it is appropriate to use a slight molar excess of base over aminocarboxylic acid. The aminocarboxylic acid and the base also serve to neutralize the hydrochloric acid which is liberated, and so a fairly large amount of base may also be chosen. Furthermore, by varying the relative amount of the aminocarboxylic acid to sulfochloride, by the presence and the amount of the base, and by the choice of the temperature it is possible deliberately to react one part of the sulfochloride groups with the aminocarboxylic acid and to hydrolyze the other part to form the sulfo acid group. Examples of a suitable base include the alkali metal hydroxides and alkaline earth metal hydroxides, but also, for example, their carbonates, acetates, phosphates, or tertiary amines or nitrogen-containing heterocycles such as pyridine.

In the case of subsequent laking the compound prepared by the above process is reacted with a metal salt based on $E^+$ or $G^+$, for example, a chloride, sulfate, carbonate, nitrate, hydroxide, acetate or phosphate of the abovementioned metal cations, preferably in a molar ratio of from (0.1:10) to (10:0.1), at temperatures from 0 to 200° C., and appropriately in an aqueous or aqueous-organic medium.

In the case of a reaction with one of the abovementioned ammonium ions the compound prepared by the above process is reacted with an ammonium salt or amine based on $E^+$ or $G^+$, preferably in a molar ratio of from (0.1:10) to (10:0.1), at temperatures from 0 to 200° C., and appropriately in an aqueous or aqueous-organic medium.

Normally the pigment dispersants prepared in accordance with the invention consist of a mixture with different degrees of substitution, so that the numbers s, n, and s+n may also take on fractional numerical values. Said numerical values may also be less than 1; consequently, a pigment preparation may in fact come about during the inventive preparation of the pigment dispersant.

The present invention further provides a pigment preparation characterized by the presence therein of
a) at least one organic base pigment and
b) at least one pigment dispersant of the formula (II)

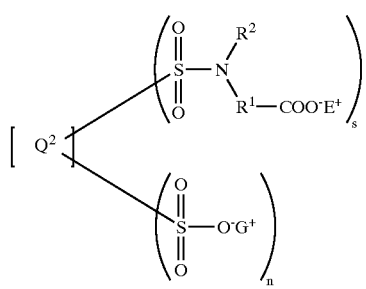

in which
$Q^2$ is a radical of an organic pigment from the group of the phthalocyanines with or without the central metal cation, such as Cu, Al, Zn, Fe, Ni or Co, for example, where appropriate with 1 to 8 halogen atoms, halogen being Cl or Br; azo, benzimidazolone, disazo condensation, perinone, quinacridone, quinacridonequinone, anthanthrone, indanthrone, dioxazine, such as triphendioxazine, for example, diketopyrrolopyrrole, indigo, thioindigo, thiazineindigo, isoindoline, isoindolinone, pyranthrone, isoviolanthrone, flavanthrone or anthrapyrimidine pigments; and
s, n, $R^1$, $R^2$, $E^+$, and $G^+$ are as defined above.

Preferred radicals $Q^2$ of an organic pigment for the purposes of the present invention are for example C.I. Pigment Yellow 1, 3, 12, 13, 14, 16, 17, 62, 65, 73, 74, 75, 81, 83, 93, 95, 97, 98, 106, 108, 109, 110, 111, 113, 114, 120, 126, 127, 128, 129, 138, 139, 147, 150, 151, 153, 154, 155, 168, 173, 174, 175, 176, 180, 181, 183, 185, 188, 191, 191:1, 194, 198, 199, 213; Pigment Orange 5, 13, 16, 34, 36, 38, 42, 43, 46, 48, 49, 60, 61, 62, 64, 67, 71, 72, 73, 74; Pigment Red 2, 3, 4, 7, 8, 9, 10, 12, 14, 17, 22, 23, 38, 48:1-4, 49:1-2, 52:1-2, 53:1-3, 57:1, 60, 60:1, 63:1, 68, 81, 81:1-2, 88, 112, 122, 137, 144, 146, 147, 166, 168, 170, 171, 175, 176, 177, 184, 185, 187, 188, 192, 194, 202, 206, 207, 208, 209, 210, 214, 220, 221, 242, 247, 251, 253, 254, 255, 256, 257, 262, 264, 266, 270, 272; Pigment Violet 1, 19, 23, 32, 37; Pigment Brown 23, 25; Pigment Blue 15, 15:1-4, 15:6, 56, 60, 61; C.I. Pigment Green 7 or 36.

By base pigment as per a) are meant organic pigments or mixtures of organic pigments, which may also be present in the form of customary pigment preparations.

Suitable base pigments as per a) for producing the pigment preparations of the invention are for example perylene, perinone, quinacridone, quinacridonequinone, anthraquinone, anthanthrone, benzimidazolone, disazo condensation, azo, indanthrone, phthalocyanine pigments with or without a central metal cation, such as Cu, Al, Zn, Fe, Ni or Co, for example, where appropriate having 1 to 16 chlorine and/or bromine atoms; triarylcarbonium, dioxazine, such as triphendioxazine, for example, aminoanthraquinone, diketopyrrolopyrrole, indigo, thioindigo, thiazineindigo, isoindoline, isoindolinone, pyranthrone, isoviolanthrone, flavanthrone, anthrapyrimidine pigments or pigment blacks; or mixed crystals or mixtures thereof.

Particularly preferred base pigments as per a) for the purposes of the present invention are for example C.I. Pigment Yellow 1, 3, 12, 13, 14, 16, 17, 62, 65, 73, 74, 75, 81, 83, 93, 95, 97, 98, 106, 108, 109, 110, 111, 113, 114, 120, 126, 127, 128, 129, 138, 139, 147, 150, 151, 153, 154, 155, 168, 173, 174, 175, 176, 180, 181, 183, 185, 188, 191, 191:1, 194, 198, 199, 213; Pigment Orange 5, 13, 16, 34, 36, 38, 42, 43, 46, 48, 49, 60, 61, 62, 64, 67, 71, 72, 73, 74; Pigment Red 2, 3, 4, 7, 8, 9, 10, 12, 14, 17, 22, 23, 38, 48:1-4, 49:1-2, 52:1-2, 53:1-3, 57:1, 60, 60:1, 63:1, 68, 81, 81:1-2, 88, 112, 122, 123, 137, 144, 146, 147, 149, 166, 168, 170, 171, 175, 176, 177, 178, 179, 184, 185, 187, 188, 190, 192, 194, 202, 206, 207, 208, 209, 210, 214, 220, 221, 224, 242, 247, 251, 253, 254, 255, 256, 257, 262, 264, 266, 270, 272; Pigment Violet 1, 19, 23, 29, 32, 37; Pigment Brown 23, 25; Pigment Blue 15, 15:1-4, 15:6, 56, 60, 61; C.I. Pigment Green 7, 36 and Pigment Black 1, 32.

In addition to the base pigment a) and the pigment dispersant b) the pigment preparations of the invention may further comprise auxiliaries c), such as surfactants, nonpigmentary and pigmentary dispersing agents, fillers, standardizers, resins, waxes, defoamers, antidust agents, extenders, shading colorants, preservatives, drying retarders, rheology control additives, wetting agents, antioxidants, UV absorbers, light stabilizers, or a combination thereof.

Preferred pigment preparations for the purposes of the present invention consist essentially of
a) from 50 to 99.9% by weight, preferably from 55 to 99.5% by weight, more preferably from 60 to 99% by weight, of a least one base pigment as per a),
b) from 0.1 to 25% by weight, preferably from 0.5 to 20% by weight, more preferably from 1 to 15% by weight, of at least one, preferably 1 or 2, pigment dispersants of the formula (II),
c) from 0 to 25% by weight, preferably from 0 to 15% by weight, of auxiliaries,
the fractions of the respective components being based on the overall weight of the preparation (100% by weight).

Suitable surfactants include anionic or anion-active, cationic or cation-active, and nonionic substances or mixtures thereof.

Examples of suitable anionic substances are fatty acid taurides, fatty acid N-methyltaurides, fatty acid isethionates, alkylphenylsulfonates, alkylnaphthalenesulfonates, alkylphenol polyglycol ether sulfates, fatty alcohol polyglycol ether sulfates; fatty acid amide polyglycol ether sulfates;

alkylsulfosuccinamates; alkenylsuccinic monoesters, fatty alcohol polyglycol ether sulfosuccinates, alkanesulfonates, fatty acid glutamates, alkylsulfosuccinates, fatty acid sarcosides; fatty acids, e.g., palmitic, stearic and oleic acid; soaps, e.g., alkali metal salts of fatty acids, naphthenic acids and resin acids, e.g., abietic acid, alkali-soluble resins, e.g., rosin-modified maleate resins. Particular preference is given to resin soaps, i.e., alkali metal salts of resin acids.

Examples of suitable cationic substances are quaternary ammonium salts, fatty amine oxalkylates, oxalkylated polyamines, fatty amine polyglycol ethers, fatty amines, diamines and polyamines derived from fatty amines or fatty alcohols, and the oxalkylates of these amines; imidazolines derived from fatty acids, and salts of these cationic substances, such as acetates, for example.

In this context nonionogenic substances are not only the uncharged substances which are not cation-active or anion-active, but also internal salts, examples being amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts, and alkylphenol polyglycol ethers.

By nonpigmentary dispersing agents are meant substances which structurally are not derived from organic pigments by chemical modification and from which substantial pigmentary properties are absent. They are added as dispersing agents either during the actual preparation of pigments, or else often when the pigments are incorporated into the application media to be colored—for example, when producing paints or printing inks, by dispersing of the pigments in the corresponding binders. They may be polymeric substances, examples being polyolefins, polyesters, polyethers, polyamides, polyimines, polyacrylates, polyisocyanates, block copolymers thereof, copolymers of the corresponding monomers, or polymers of one class modified with a few monomers of another class. These polymeric substances carry polar anchor groups such as, for example, hydroxyl, amino, imino, and ammonium groups, carboxylic acid and carboxylate groups, sulfonic acid and sulfonate groups or phosphonic acid and phosphonate groups, and may also be modified with aromatic nonpigmentary substances. Nonpigmentary dispersing agents may additionally be aromatic substances not derived from organic pigments, which have been modified chemically with functional groups. Nonpigmentary dispersing agents are known to the skilled worker and in some case are available commercially (e.g., Solsperse®, Avecia; Disperbyk®, Byk, Efka®, Efka) and/or described in the literature. The text below will name a number of types in a representational capacity, although it is also possible in principle to employ any other substances described, examples being condensation products of isocyanates and alcohols, diols or polyols, amino alcohols or diamines or polyamines, polymers of hydroxyl carboxylic acids, copolymers of olefin monomers or vinyl monomers and ethylenically unsaturated carboxylic esters, urethane-containing polymers of ethylenically unsaturated monomers, urethane-modified polyesters, condensation products based on cyanuric halides, polymers containing nitroxyl compounds, polyesteramides, modified polyamides, modified acrylic polymers, comb dispersing agents formed from polyesters and acrylic polymers, phosphoric esters, triazine-derived polymers, modified polyethers, or dispersing agents derived from aromatic nonpigmentary substances. These parent structures are in many cases modified further, for example, by chemical reaction with further substances bearing functional groups or by salt formation.

By pigmentary dispersion agents are meant pigment dispersants which derive from an organic pigment parent structure and are prepared by chemical modification of this parent structure. The pigmentary dispersing agents as well are known to the skilled worker, in some cases available commercially and/or described in the literature. They include for example saccharin-containing pigment dispersants, piperidyl-containing pigment dispersants, naphthalene- or perylene-derived pigment dispersants, pigment dispersants with functional groups linked to the pigment parent structure via a methylene group, pigment parent structures chemically modified with polymers, pigment dispersants containing sulfo acid groups, known pigment dispersants containing sulfonamide groups, pigment dispersants containing ether groups, or pigment dispersants containing carboxylic acid, carboxylic ester or carboxamide groups.

The pigment preparations of the invention can be employed as preferably aqueous presscakes, but generally comprise solid systems of free-flowing pulverulent consistency, or granules.

The dispersing effect which can be achieved in accordance with the invention is assumed to derive from a modification of the surface structure of the base pigments by the pigment dispersant as per b). Thus in a range of cases the efficacy of the pigment dispersant as per b) and the quality of the pigment preparations produced therewith are dependent on the point in time at which the pigment dispersant as per b) is added in the production process of the base pigment. Where more than one pigment dispersant as per b) is used, the dispersants may be added simultaneously or at different points in time or may be mixed prior to their addition.

The efficacy of the pigment dispersant as per b) may also depend on its particle size and particle shape and on the extent of the available pigment surface. It may be advantageous to add the pigment dispersant as per b) to the base pigment only in the prospective application medium. The optimum concentration of the pigment dispersant as per b) in each case must be determined by means of preliminary rangefinding tests, since the enhancement of the properties of the base pigments as per a) is not always in linear proportion to the amount of pigment dispersant.

The pigment preparations of the invention may comprise mixtures of one or more, preferably 1, 2 or 3, base pigments as per a) with one or more, preferably 1 or 2, of the pigment dispersants as per b).

The invention also provides a process for producing a pigment preparation of the invention, which comprises mixing the pigment dispersant(s) as per (b) and the base pigment(s) as per a) with one another or causing them to act on one another during their production process. The production process of an organic pigment embraces its synthesis, fine division and/or dispersing, by grinding, kneading or reprecipitation, for example, possibly finishing, and its isolation as a presscake or in the form of dry granules or powder. For example, the pigment dispersant as per b) may be added prior to, during or after one of the customary process steps such as, for example, the synthesis, fine division process, finishing, isolation, drying or pulverizing. For example, its addition during the actual synthesis may lead to fine particles. The pigment dispersant as per b) can of course also be added in portions at different times.

The addition of the pigment dispersant as per b) as part of a fine division process takes place, for example, prior to or during a salt kneading, prior to or during the dry grinding of a crude pigment or prior to or during the wet grinding of a crude pigment.

It has also proven suitable to add the pigment dispersant as per b) prior to or after finishing the base pigment in an aqueous or aqueous-organic medium at arbitrary pH or in organic medium.

It is also possible to combine the laking of the pigment dispersant as per b) by reaction of its free acid with a metal salt or its reaction with an ammonium compound with the production of the pigment preparation of the invention. For example, the pigment dispersant as per b) only in the form of its free acid can be added to a suspension of the base pigment as per a) and then a metal salt or an ammonium compound can be added in the presence of a base pigment as per a). Another possible variant is the separate laking or reaction of the pigment dispersant as per b) with a metal salt or an ammonium compound to form a suspension and the addition of this suspension to the suspension of the base pigment as per b).

The pigment dispersant as per b) may also be added to the preferably water-moist pigment presscake, and incorporated, before drying, in which case the pigment dispersant as per b) may itself be present as a presscake. A further possibility is to make dry mixes of powders or granules of the pigment dispersant as per b) with the powder or granules of the base pigment as per a), or to effect mixing while grinding or pulverizing components a) and b).

The pigment preparations of the invention are notable particularly in paints for their outstanding coloristic and rheological properties, especially for outstanding rheology, high flocculation stability, high transparency, easy dispersibility, good gloss behavior, high color strength, ideal fastness to overcoating and to solvents, and very good weather fastness. They can be used in solventborne or aqueous systems.

The pigment preparations produced in accordance with the invention may be used to pigment high molecular mass organic materials of natural or synthetic origin, examples being plastics, resins, varnishes, paints, or electrophotographic toners and developers, and also writing, drawing and printing inks.

Examples of high molecular mass organic materials which may be pigmented with the stated pigment preparations are cellulose ethers and cellulose esters, such as ethylcellulose, nitrocellulose, cellulose acetate or cellulose butyrate, natural resins or synthetic resins, such as addition-polymerization resins or condensation resins, e.g., amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures. It is unimportant here whether the abovementioned high molecular mass organic compounds are present in the form of plastic masses, melts, spinning solutions, varnishes, paints or printing inks. Depending on the intended use it is found advantageous to utilize the pigment preparations, obtained in accordance with the invention, as a blend or in the form of prepared formulations or dispersions. Based on the high molecular mass organic material for pigmentation, the pigment preparations of the invention are used in an amount of from 0.05 to 30% by weight, preferably from 0.1 to 15% by weight.

The pigment dispersants and pigment preparations of the invention are also suitable as colorants in electrophotographic toners and developers, such as one- or two-component powder toners (also called one- or two-component developers), magnetic toners, liquid toners, polymerization toners, and specialty toners, for example (L. B. Schein, "Electrophotography and Development Physics"; Springer Series in Electrophysics 14, Springer Verlag, 2nd edition, 1992).

Typical toner binders are addition polymerization, polyaddition and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may include further constituents, such as charge control agents, waxes or flow assistants, or may be modified subsequently with these additives.

Furthermore, the pigment dispersants and pigment preparations of the invention are suitable as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber (J. F. Hughes, "Electrostatics Powder Coating" Research Studies, John Wiley & Sons, 1984).

Typical powder coating resins used are epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyandiamide and derivatives thereof, blocked isocyanates, bisacylurethanes, phenolic resins and melamine resins, triglycidyl isocyanurates, oxazolines, and dicarboxylic acids.

In addition, the pigment dispersants and pigment preparations of the invention are suitable as colorants in inkjet inks on either an aqueous or nonaqueous basis and in those inks which operate in accordance with the hot-melt process.

Furthermore, the pigment dispersants and pigment preparations of the invention are also suitable as colorants for color filters for both additive and subtractive color generation.

It is also possible for the pigment dispersant as per b) to be added to the base pigment a), or vice versa, only in the application medium.

The invention therefore further provides a prepared pigment formulation consisting essentially of one or more organic base pigments a), one or more pigment dispersants as per b), said high molecular mass organic material, especially varnish, and, if desired, surface-active agents and/or other customary additives. The overall amount of base pigment plus pigment dispersant as per b) is, for example, from 0.05 to 30% by weight, preferably from 0.1 to 15% by weight, based on the overall weight of the prepared pigment formulation.

In order to evaluate the properties in the coatings sector of the pigment preparations, a selection was made, from among the large number of known varnishes, of a polyester varnish (PE) based on cellulose acetobutyrate and on a melamine resin, of a high-solids acrylic resin baking varnish based on a nonaqueous dispersion (HS), and of a polyurethane-based aqueous varnish (PUR).

The color strength and shade were determined in accordance with DIN 55986. The rheology of the millbase after dispersion (millbase rheology) was evaluated visually on the basis of the following five-point scale:

| | |
|---|---|
| 5 | highly fluid |
| 4 | liquid |
| 3 | viscous |
| 2 | slightly set |
| 1 | set |

Following dilution of the millbase to the final pigment concentration, the viscosity was assessed using the Rossmann viscospatula type 301 from Erichsen. The fastness to overcoating was determined in accordance with DIN 53221. In the examples below, parts and percentages are in each case by weight. "min" are minutes.

EXAMPLE 1a

A four-necked flask is charged with 250 parts of chlorosulfonic acid, and 25 parts of 1,4-diketo-3,6-di(4-biphenyl) pyrrolo[3,4-c]pyrrole are introduced and dissolved at a rate such that the temperature does not exceed 25° C. Then 19.6 parts of thionyl chloride are added dropwise over the course of 15 min and the mixture is stirred for 15 min. Over the course of 15 min, the solution is added dropwise to 1600 parts of ice-water, prepared from 1400 parts of ice and 200 parts of water. The precipitated sulfochloride is filtered and washed with 750 parts of cold water. A four-necked flask is charged with 70 parts of ice, 70 parts of water, 26.3 parts of β-alanine and 38.6 parts of 33% strength aqueous sodium hydroxide and the sulfochloride presscake is introduced at from 0 to 5° C. The mixture is then stirred at 0 to 5° C. for 1 h, heated to 25° C. in 30 min, stirred at 25° C. for 30 min, heated to 50° C. in 30 min and stirred at 50° C. for 30 min. Then 300 parts of water are added and the mixture is heated to 70° C. in 30 min and stirred at 70° C. for 30 min. Using 150.9 parts of 10% strength aqueous hydrochloric acid a pH of 2.0 is set. The product is filtered, washed with water and dried at 80° C. This gives 40.5 parts of pigment dispersant.

The $^1$H NMR spectrum in $D_2SO_4$ shows the expected signals between 7.5 and 8.2 ppm of the aromatic ring system and two strong signals at 2.8 and 3.4 ppm of the two methylene groups. The degree of amidation, s, calculated from the intensities is 1.7. Boiling of the sulfochloride in water produces by hydrolysis the free sulfo acid (see Example 1b), which is found by mass-spectrometric analysis to contain 2 sulfonic acid groups, i.e., s+n=2 and thus, by calculation, n=0.3.

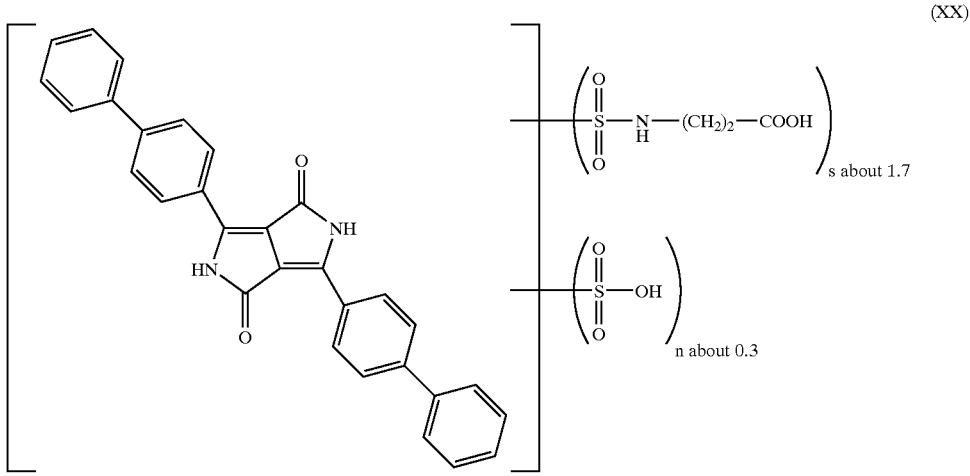

(XX)

EXAMPLE 1b

Determination of the Degree of Substitution n

The procedure described in Example 1a) is repeated with the difference that the washed sulfochloride presscake is introduced into 800 parts of water and stirred at boiling temperature for 7 hours. The suspension is concentrated by evaporation under reduced pressure at 60° C.

Mass-spectrometric analysis shows that the compound is a disulfo acid (degree of substitution of n=2 and s=0).

EXAMPLE 1c

Comparative Example

The procedure described in Example 1a) is repeated with the difference that instead of the 26.3 parts of β-alanine (0.29 mol) 36.5 parts of taurine (0.29 mol) are used. This gives 44.5 parts of pigment dispersant.

The $^1$H NMR spectrum in $D_2SO_4$ shows the expected signals between 7.5 and 8.2 ppm of the aromatic ring system and two strong signals at 3.4 and 3.6 ppm of the two methylene groups. The degree of amidation, s, calculated from the intensities is 1.7, so that the pigment dispersant corresponds to that of Example 1a with the sole difference that instead of the carboxylic acid group a sulfonic acid group is attached to the methylene group.

EXAMPLE 1d

Starting with 260.8 parts of tert-amyl alcohol, 17.1 parts of sodium are added. The mixture is then heated to boiling and stirred until all of the sodium has reacted. After the mixture has cooled to 98° C., 53.7 parts of 4-cyanobiphenyl are introduced and, over the course of 2 hours, 39.3 parts of diisopropyl succinate are added dropwise. The reaction suspension is then stirred at boiling temperature for 4 hours and cooled to 80° C. In a receiver, 5.7 parts of pigment dispersant of the formula (XX), prepared as in Example 1a, are suspended in 400 parts of water, the pH is adjusted to 10.3 using aqueous sodium hydroxide solution, and the pigment dispersant is dissolved. Then 18.5 parts of aluminum sulfate 18-hydrate are added and the mixture is made up to 800 parts with water at 0° C. The reaction suspension, at a temperature of 80° C., is precipitated into this receiver, with subsequent washing with 60 parts of tert-amyl alcohol. The suspension is heated to boiling and stirred at boiling temperature for 0.5 hours. The amyl alcohol is then removed by steam distillation. After the suspension has cooled to room temperature, 400 parts of methanol are added. The suspension is filtered with suction and the solid product is washed with methanol and then with water and dried at 80° C. This gives 50 parts of pigment preparation.

The pigment preparation gives transparent and strongly colored coatings in the PUR varnish; the metallic coating is strongly and deeply colored.

COMPARATIVE EXAMPLE 1e

To EP 224 445

The procedure described in Example 1d) is repeated with the difference that instead of the pigment dispersant of the formula (XX) of Example 1a) the disulfo acid of Example 1b) is used.

As compared with the pigment preparation produced as in Example 1d), the pigment preparation based on the disulfo acid produces coatings having a more marked hiding effect, of paler color, in the PUR varnish, and is therefore inferior.

COMPARATIVE EXAMPLE 1f

To U.S. Pat. No. 5,698,618

The procedure described in Example 1d) is repeated with the difference that instead of the pigment dispersant of the formula (XX) of Example 1a) the pigment dispersant of Example 1c) is used.

As compared with the pigment preparation of Example 1d) (sulfonamide of β-alanine), the pigment preparation based on the sulfonamide of taurine brings about a viscosity which is twice as high (13.1 s as against 6.9 s) in the HS varnish, while in the PUR varnish and in the PE varnish the coating is weaker in color. Accordingly, this pigment preparation is inferior and cannot be used as universally as the pigment preparation of the invention.

EXAMPLE 2a

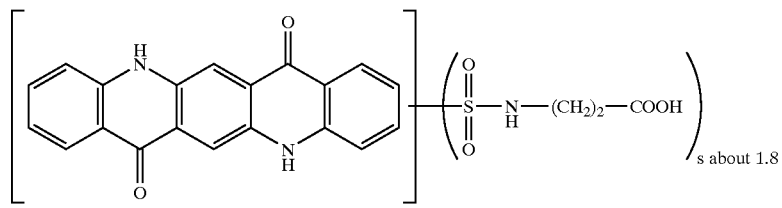

(XXI)

A four-necked flask is charged with 360 parts of chlorosulfonic acid, and 30 parts of commercial quinacridone pigment P.V. 19 are introduced over 10 minutes and dissolved. The solution is then heated to 100° C. and stirred at 100° C. for 4 hours. After it has cooled to 75° C., 29.8 parts of thionyl chloride are added dropwise over the course of 25 min and then the solution is stirred at 85° C. for 2 hours. The solution is cooled to room temperature and added dropwise to 1840 parts of ice-water prepared from 1640 parts of ice and 200 parts of water. The precipitated sulfochloride is filtered. A four-necked flask is charged with 500 parts of ice, 500 parts of water, 90.9 parts of 98%-pure β-alanine and 133.3 parts of 33% strength aqueous sodium hydroxide solution and the sulfochloride presscake is introduced at from 0 to 5° C. The mixture is then stirred at 0 to 5° C. for 1 h, warmed to 25° C. in 30 min, stirred at 25° C. overnight, heated to 50° C. in 30 min and stirred at 50° C. for 30 min, heated to 70° C. in 30 min and stirred at 70° C. for 30 min. Using 563.6 parts of 10% strength aqueous hydrochloric acid a pH of 1.8 is set. The product is filtered, suspended in 1500 parts of water and filtered, suspended in 305 parts of 10% strength aqueous hydrochloric acid and filtered again, and dried under reduced pressure at 80° C. This gives 49.8 parts of pigment dispersant.

The $^1$H NMR spectrum in $D_2SO_4$ shows the expected signals at 9.2; 9.1; 8.2 and 8.0 ppm of the aromatic ring system and two strong signals at 3.3 and 2.8 ppm of the two methylene groups. The degree of substitution, s, calculated from the intensities is 1.8.

EXAMPLE 2b 1.3 parts of pigment dispersant of the formula (XXI) from Example 2a) are suspended in 100 parts of water, and a pH of 10.8 is set using 33% strength aqueous sodium hydroxide solution. Then 10 parts of aluminum sulfate 18-hydrate are added. This suspension is added to a suspension of 116.7 parts of a 21.4% water-moist presscake of a commercial quinacridone pigment, P.R. 122, in 383.3 parts of water. The mixture is heated to boiling and stirred at reflux for one hour. After cooling to room temperature it is filtered, washed with water and dried at 80° C. This gives 25.7 parts of pigment preparation.

In the PUR varnish the pigment preparation produces transparent, clean and strongly colored coatings, the metallic coating is strongly colored and bright, the overcoating fastness is excellent, the rheology is evaluated at 5.

EXAMPLE 3a hydrochloric acid and filtered again, and dried under reduced pressure at 80° C. This gives 69.3 parts of pigment dispersant.

Elemental analysis gives a result of 7.4% sulfur, corresponding to a degree of substitution, s, of 2.1.

EXAMPLE 3b 2.5 parts of pigment dispersant of the formula (XXII) from Example 3a) are suspended in 100 parts of water, and a pH of 11.1 is set using 33% strength aqueous sodium hydroxide solution. Then to a solution of 5.1 parts of 98%-pure calcium chloride in 100 parts of water is added. This suspension of the pigment dispersant is added to a pigment suspension prepared from 441.9 parts of water and 58.2 parts of a 43% water-moist presscake of a commercial dioxazine pigment P.V. 23. The mixture is heated to boiling and stirred at reflux for one hour. After cooling to room temperature it is filtered, washed with water and dried at 80° C. This gives 26.7 parts of pigment preparation.

In the PUR varnish the pigment preparation gives transparent, strongly colored coatings; the metallic coating is strongly and deeply colored. The overcoating fastness is excellent.

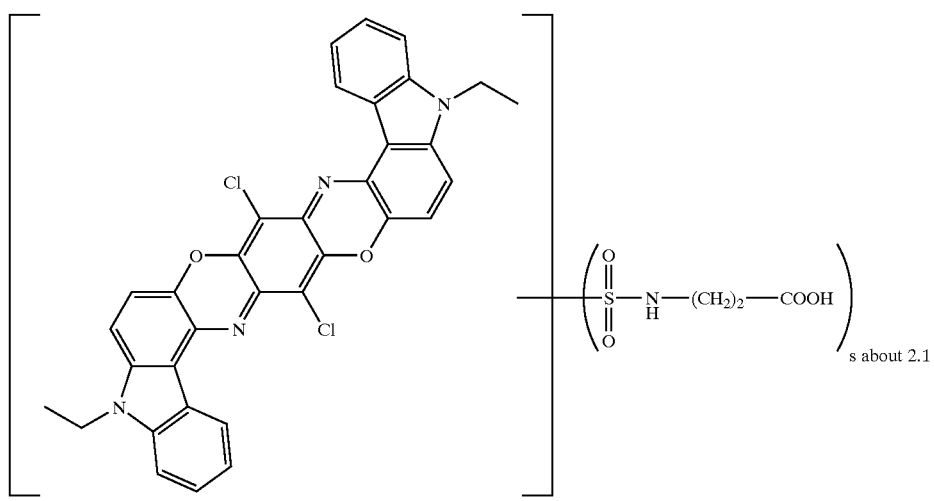

(XXII) s about 2.1

A four-necked flask is charged with 350 parts of chlorosulfonic acid, and 85 parts of vinyl chloride are added. Then 50 parts of dioxazine pigment P.V. 23 are introduced over 10 minutes and dissolved. The solution is stirred at room temperature for 19 hours. The solution is added dropwise to 2120 parts of ice-water prepared from 1920 parts of ice and 200 parts of water. The precipitated sulfochloride is filtered and washed with 750 parts of cold water. A four-necked flask is charged with 250 parts of ice, 250 parts of water, 40.9 parts of 98%-pure β-alanine and 60.0 parts of 33% strength aqueous sodium hydroxide solution and the sulfochloride presscake is introduced at from 0 to 5° C. The mixture is then stirred at 0 to 5° C. for 1 h, warmed to 25° C. in 30 min, stirred at 25° C. overnight, heated to 50° C. in 30 min and stirred at 50° C. for 30 min, heated to 70° C. in 30 min and stirred at 70° C. for 30 min. Using 232.6 parts of 10% strength aqueous hydrochloric acid a pH of 1.9 is set. The product is filtered, twice suspended in 1500 parts of water and filtered, suspended in 462 parts of 10% strength aqueous

EXAMPLE 4a

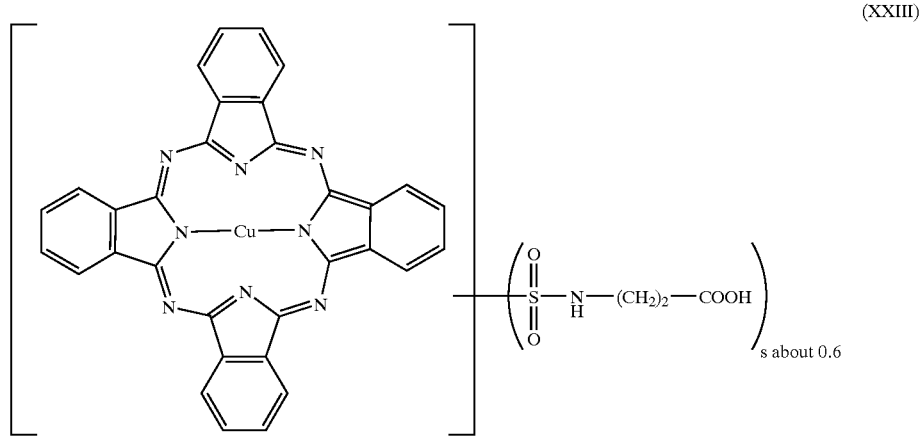

(XXIII)

A four-necked flask is charged with 372.8 parts of chlorosulfonic acid, and 57.6 parts of a crude pigment of copper phthalocyanine P. Blue 15 are introduced and dissolved. The solution is then heated to 80° C. and stirred at 80° C. for 4 hours. After it has cooled to 75° C., 53.6 parts of thionyl chloride are added dropwise at 75° C. over 30 min. The solution is then heated to 85° C. and stirred at 85° C. for 2 h. After it has cooled to room temperature the solution is added dropwise to 2042 parts of ice-water prepared from 1842 parts of ice and 200 parts of water. The precipitated sulfochloride is filtered and washed with 750 parts of cold water. A four-necked flask is charged with 375 parts of ice, 375 parts of water, 45.5 parts of 98%-pure β-alanine and 66.7 parts of 33% strength aqueous sodium hydroxide solution and, the sulfochloride presscake is introduced at from 0 to 5° C. The mixture is then stirred at 0 to 5° C. for 1 h, warmed to 25° C. in 30 min, stirred at 25° C. for 30 min, heated to 50° C. in 30 min and stirred at 50° C. for 30 min, heated to 70° C. in 30 min and stirred at 70° C. for 30 min. Using 371.7 parts of 10% strength aqueous hydrochloric acid the pH is adjusted to 1.9. The product is filtered, washed with water dried at 80° C. This gives 61 parts of a pigment preparation.

Elemental analysis gives a result of 2.8% sulfur and 60.9% carbon. This corresponds to a degree of substitution, s, of 0.6.

EXAMPLE 4b

Finely Divided CuPc 200 parts of a commercial tetrachloro-copper phthalocyanine pigment P. Blue 15:1 are dissolved in 2000 parts of 96% strength sulfuric acid. The solution is poured into a mixture of 5200 parts of ice and 24000 parts of water over 25 min. The suspension of the pigment is filtered and washed with water. This gives 989.6 parts of an aqueous pigment presscake with a concentration of 20.5%, which is divided into three portions each of 329.8 parts of pigment presscake. One portion of this pigment presscake is suspended in 1087.7 parts of water, the suspension is adjusted to a pH of 9.5 using 33% strength aqueous sodium hydroxide solution, and 2 parts of the $C_{12}$ alcohol are added. The suspension is stirred at 130° C. under pressure for one hour. The same procedure is carried out with the two other portions. The three suspensions are combined, filtered, and washed. This give 858 parts of aqueous pigment presscake with a concentration of 22.8%.

100 parts of this pigment presscake are dried at 80° C. to give 22.8 parts of dry pigment.

EXAMPLE 4c 103.3 parts of the 22.8% pigment presscake produced in Example 4b) are suspended in 366.8 parts of water. A pH of 8.3 is set using 33% strength aqueous sodium hydroxide solution and the suspension is then heated to 60° C.

2.4 parts of pigment dispersion of the formula (XXIII) from Example 4a) are suspended in 200 parts of water, the pH is adjusted to 10.8 using 33% strength aqueous sodium hydroxide solution, and then 20 parts of aluminum sulfate 18-hydrate are added. The mixture is added to the pigment suspension, which is at a temperature of 60° C. The resulting mixture is stirred at 60° C. for 30 min and then filtered and the solid product is washed with water and dried at 80° C. This gives 25.5 parts of pigment preparation.

In the PUR varnish the pigment preparation gives transparent, strongly colored coatings; the metallic coating is strongly and deeply colored. As compared with a coating formed from the dry pigment prepared in Example 4b without pigment dispersant it is much stronger in color and the metallic coating is noticeably brighter.

EXAMPLE 5a

A four-necked flask is charged with 250 parts of chlorosulfonic acid, and 25 parts of 1,4-diketo-3,6-di(4-biphenyl) pyrrolo[3,4-c]pyrrole are introduced and dissolved at a rate such that the temperature does not exceed 25° C. Then 19.6 parts of thionyl chloride are added dropwise over the course of 15 min and the mixture is stirred for 15 min. Over the course of 15 min, the solution is added dropwise to 1600 parts of ice-water, prepared from 1400 parts of ice and 200 parts of water. The precipitated sulfochloride is filtered and washed with 750 parts of cold water. A four-necked flask is charged with 250 parts of ice, 250 parts of water, 38.4 parts of 6-aminocaproic acid and 38.6 parts of aqueous sodium hydroxide and the sulfochloride presscake is introduced at from 0 to 5° C. The mixture is then stirred at 0 to 5° C. for 1 h, heated to 25° C. in 30 min, stirred at 25° C. for 30 min, heated to 50° C. in 30 min, stirred at 50° C. for 30 min, heated to 70° C. in 30 min and stirred at 70° C. for 30 min. Using 163.8 parts of 10% strength aqueous hydrochloric acid a pH of 1.8 is set. The product is filtered, washed with water and dried at 80° C. This gives 42.1 parts of pigment dispersant.

The $^1$H NMR spectrum in $D_2SO_4$ shows the expected signals between 7.6 and 7.9 ppm of the aromatic ring system and four signals at 1.1; 1.4; 2.5 and 3.1 ppm of the five methylene groups, with the signal at 1.4 ppm having twice the intensity of the other three aliphatic signals. The degree of amidation, s, calculated from the intensities is about 1.7. In accordance with Example 1b, two sulfonic acid groups are introduced in the sulfochlorination, i.e., s+n=2 and thus, by calculation, n=about 0.3.

A four-necked flask is charged with 360 parts of chlorosulfonic acid, and 30 parts of commercial quinacridone pigment P.V. 19 are introduced over 10 minutes and dissolved. The solution is then heated to 100° C. and stirred at 100° C. for 4 hours. After it has cooled to 75° C., 29.8 parts of thionyl chloride are added dropwise over the course of 25 min and then the solution is stirred at 85° C. for 2 hours. The solution is cooled to room temperature and added dropwise to 1800 parts of ice-water prepared from 1600 parts of ice and 200 parts of water. The precipitated sulfochloride is filtered. A four-necked flask is charged with 500 parts of ice, 500 parts of water, 138.6 parts of 4-aminobenzoic acid and 133.3 parts of 33% strength aqueous sodium hydroxide solution and the sulfochloride presscake is introduced at from 0 to 5° C. The mixture is then stirred at 0 to 5° C. for 1 h, warmed to 25° C. in 30 min, stirred at 25° C. overnight, heated to 50° C. in 30 min and stirred at 50° C. for 30 min, heated to 70° C. in 30 min and stirred at 70° C. for 30 min, heated to 90° C. in 30 min and stirred at 90° C. for 30 min; by adding about 175 parts of 33% strength aqueous sodium

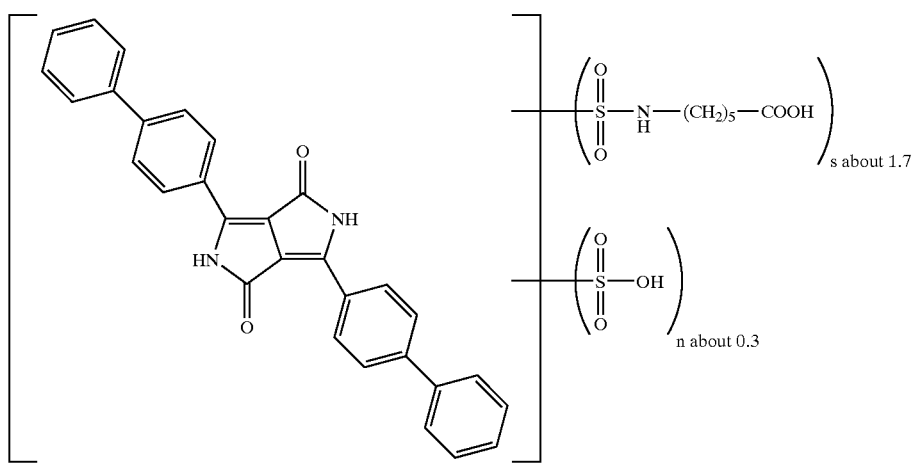

(XXIV)

EXAMPLE 5d 40 parts of a commercial anthraquinone pigment P.R. 177 are mixed with 2 parts of pigment dispersant of the formula (XXIV) prepared according to Example 5a to form a pigment preparation. In the PE varnish the pigment preparation gives strongly colored coatings; the metallic coating is strongly colored and bright.

EXAMPLE 6a hydroxide solution during the temperature program the pH is maintained >10. Using 728.8 parts of 10% strength aqueous hydrochloric acid a pH of 1.8 is set. The product is filtered, suspended in 400 parts of 10% strength aqueous hydrochloric acid and filtered, and dried under reduced pressure at 80° C. This gives 61.8 parts of pigment dispersant.

The $^1$H NMR spectrum in $D_2SO_4$ shows the expected signals at 9.2; 8.95; 8.15; 7.9; 7.75; 7.3 and 7.0 ppm of the

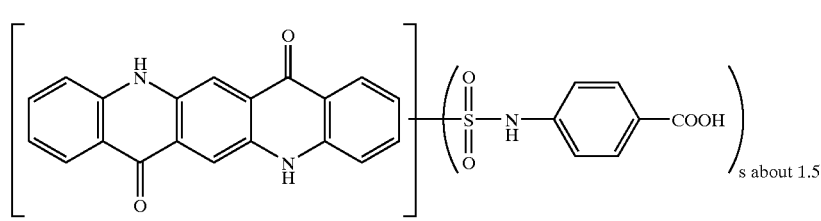

(XXV)

aromatic ring systems. The degree of substitution, s, calculated from the intensities is about 1.5.

EXAMPLE 6b 4 parts of pigment dispersant of the formula (XXV) prepared as in Example 6a) are mixed with 40 parts of a commercial quinacridone pigment P.R. 122 to form a pigment preparation.

As compared with the commercial quinacridone pigment P.R. 122 used for the mixture, in the PUR varnish the pigment preparation gives more transparent, more strongly colored, and cleaner coatings; the metallic coating is stronger in color and brighter. In the HS and PE varnishes, too, brighter and more strongly colored metallic coatings are obtained. In the HS varnish the pigment dispersant reduces the viscosity (1.5 s as against 4.7 s), while the gloss is increased (62 against 47). In the PE varnish as well there is a reduction in the viscosity (2.9 s as against 5.0 s).

EXAMPLE 7a

A four-necked flask is charged with 372.8 parts of chlorosulfonic acid, and 57.6 parts of a crude pigment of copper phthalocyanine P. Blue 15 are introduced and dissolved. The solution is then heated to 95° C. and stirred at 95° C. for 4 hours. After it has cooled to 75° C., 53.6 parts of thionyl chloride are added dropwise at 75° C. over 25 min. The solution is then heated to 85° C. and stirred at 85° C. for 2 h. After it has cooled to T<40° C. the solution is added dropwise to 2050 parts of ice-water prepared from 1850 parts of ice and 200 parts of water. The precipitated sulfochloride is filtered and washed with 750 parts of cold water. A four-necked flask is charged with 375 parts of ice, 375 parts of water, 54.6 parts of 98%-pure β-alanine and 80 parts of 33% strength aqueous sodium hydroxide solution, and the sulfochloride presscake is introduced at from 0 to 5° C. The mixture is then stirred at 0 to 5° C. for 1 h, warmed to 25° C. in 30 min, stirred at 25° C. for 30 min, heated to 50° C. in 30 min and stirred at 50° C. for 30 min, heated to 70° C. in 30 min and stirred at 70° C. for 30 min. Using 404.9 parts of 10% strength aqueous hydrochloric acid the pH is adjusted to 1.9. The product is filtered, washed with water and dried at 80° C. This gives 71.4 parts of a pigment preparation.

Elemental analysis gives a result of 5.6% sulfur and 16.8% nitrogen. This corresponds to a degree of substitution, s, of about 1.4.

EXAMPLE 7b

A ground and commercial crude pigment of a copper phthalocyanine P.Blue 15 is prepared by stirring with 12% by weight of the pigment dispersant of the formula (XXVI), prepared as in Example 7a, in 50% isobutanol at a pH>12, and this preparation is stirred under pressure at 130° C. After cooling, the isobutanol is removed by steam distillation and the pigment preparation is isolated and dried.

In a nitrocellulose printing ink varnish the pigment preparation gives a strongly colored, reddish, transparent print; in an alkyd-melamine varnish system a strongly colored, transparent, and glossy coating of excellent overcoating fastness is obtained.

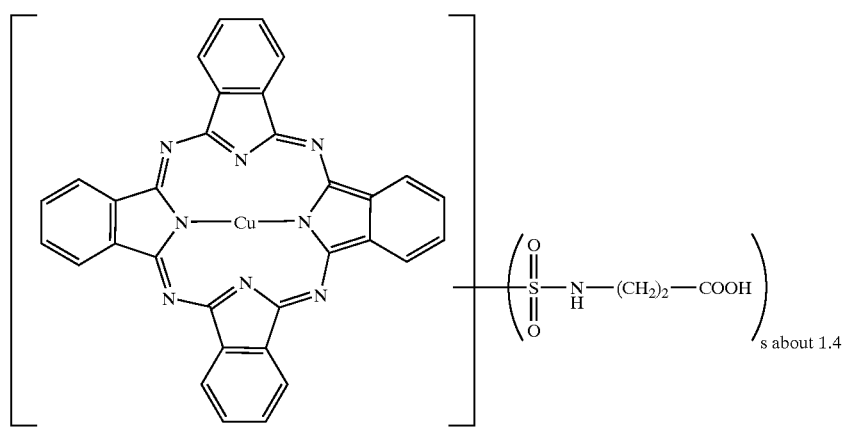

(XXVI)

What is claimed is:

1. A pigment dispersant of the general formula (I)

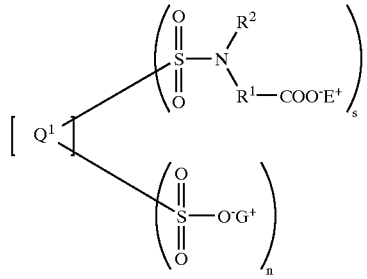

in which $Q^1$ is a radical of an organic pigment selected from the group consisting of perinone, quinacridone, quinacridonequinone, anthanthrone, indanthrone, dioxazine, diketopyrrolopyrrole, indigo, thioindigo, thiazineindigo, isoindoline, isoindolinone, pyranthrone, isoviolanthrone, flavanthrone and anthrapyrimidine pigments;

s is a number from 1 to 5;
n is a number from 0 to 4;
the sum of a and n being from 1 to 5;
$R^1$ is a divalent branched or unbranched, saturated or unsaturated, aliphatic hydrocarbon radical having 1 to 20 carbon atoms, or a $C_5$–$C_7$-cycloalkylene radical, or a divalent aromatic radical having 1, 2 or 3 aromatic rings, optionally the rings are in fused form or are linked by a bond or a heterocyclic radical having 1,2 or 3 rings which contains 1, 2, 3 or 4 heteroatoms selected from the group consisting of O, N, S, and combinations thereof; optionally the aliphatic hydrocarbon radical, cycloalkylene, aromatic and heteroaromatic radicals are substituted by 1, 2, 3 or 4 substituents selected from the group consisting of OH, CN, F, Cl, Br, $NO_2$, $CF_3$, $C_1$–$C_6$-alkoxy, S—$C_1$–$C_6$-alkyl, $NHCONH_2$, NHC(NH)$NH_2$, NHCO—$C_1$–$C_6$-alkyl, $C_1$–$C_6$-alkyl, $COOR^{20}$, $CONR^{20}R^{21}$, $NR^{20}R^{21}$, $SO_3R^{20}$ and $SO_2$—$NR^{20}R^{21}$, $R^{20}$ and $R^{21}$ being identical or different and being hydrogen, phenyl or $C_1$–$C_6$-alkyl;
$R^2$ is hydrogen, $HR^1$ or $R^1$—$COO^-E^+$;
$E^+$ and $G^+$ independently of one another are or the equivalent $M^{m+}/m$ of a metal cation $M^{m+}$ from main groups 1 to 5 or transition groups 1 or 2 or 4 to 8 of the periodic system of the chemical elements, m being 1, 2 or 3; an ammonium ion $N^+R^9R^{10}R^{11}R^{12}$,
where the substituents $R^9$, $R^{10}$, $R^{11}$ and $R^{12}$ independently of one another are each a hydrogen atom, $C_1$–$C_{30}$-alkyl, $C_2$–$C_{30}$-alkenyl, $C_5$–$C_{30}$-cycloalkyl, phenyl, ($C_1$–$C_6$)-alkyl-phenyl, ($C_1$–$C_4$)-alkylene-phenyl or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$–$C_4$-alkyl or, if k is >1, a combination thereof;
and in which alkyl, alkenyl, cycloalkyl, phenyl or alkylphenyl $R^9$, $R^{10}$, $R^{11}$, and/or $R^{12}$ may be substituted by amino, hydroxyl and/or carboxyl;
or where the substituents $R^9$ and $R^{10}$, together with a quaternary nitrogen atom, form a five- to seven-membered saturated ring system containing, optionally, further heteroatoms selected from the group consisting of O, S and N;
or where the substituents $R^9$, $R^{10}$ and $R^{11}$, together with a quaternary nitrogen atom, form a five- to seven-membered aromatic ring system, containing, optionally, further heteroatoms selected from the group consisting of O, S and N, and to which, optionally, additional rings may be fused;
or in which $E^+$ and/or $G^+$ defines an ammonium ion of the formula (Ia)

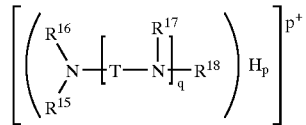

(Ia)

in which
$R^{15}$, $R^{16}$, $R^{17}$ and $R^{18}$ independently of one another are hydrogen or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$–$C_4$-alkyl or, if k is >1, a combination thereof;
q is a number from 1 to 10;
p is a number from 1 to 5, where p is ≦q+1;
T is a branched or unbranched $C_2$–$C_8$-alkylene radical; or in which T, if q is >1, may also be a combination of branched or unbranched $C_2$–$C_6$-alkylene radicals.

2. The pigment dispersant of claim 1, wherein s is a number from 1 to 3, n is a number from 0 to 2, and the sum of n and s is a number from 1 to 3.

3. The pigment dispersant of claim 1 wherein $R^1$ is a branched or unbranched $C_1$–$C_{10}$-alkylene group or phenylene radical.

4. The pigment dispersant of claim 1, wherein $R^2$ is hydrogen or $C_1$–$C_6$-alkyl.

5. The pigment dispersant of claim 1, wherein $E^+$ and $G^+$ have the definition $H^+$ or $Na^+$, or, in the case of the equivalent $M^{m+}/m$, the metal cation $M^{m+}$ has the definition $Ca^{2+}$, $Sr^{2+}$, $Ba^{2+}$ or $Al^{3+}$.

6. A process for preparing a pigment dispersant of claim 1, comprising the steps of chlorosulfonating an organic pigment selected from the group consisting of perinone, quinacridone, quinacridonequinone, anthanthrone, indanthrone, dioxazine, diketopyrrolopyrrole, indigo, thioindigo, thiazineindigo, isoindoline, isoindolinone, pyranthrone, isoviolanthrone, flavanthrone and anthrapyrimidine pigments to form a chlorosulfonated organic pigment, and reacting the chlorosulfonated organic pigment with an aminocarboxylic acid of the formula (V)

(V)

and, optionally, the free acid is reacted with an ammonium salt or metal salt based on $G^+$ or $E^+$.

7. A process for producing a pigment preparation comprising the step of mixing at least one pigment dispersant as claimed in claim 1 with at least one organic pigment during a preparation process for the at least one organic pigment to form the pigment presentation.

8. The process of claim 7, wherein the mixing step further comprises mixing at least one auxiliary with the at least one organic pigment and the at least one pigment dispersant.

9. A process for producing a pigment preparation comprising the step of adding at least one pigment dispersant as claimed in claim 1 to at least one organic pigment during a preparation process for the at least one organic pigment to form the pigment presentation.

10. The process of claim 9, wherein the adding step further comprises causing at least one auxiliary to act on the at least one organic pigment and the at least one pigment dispersant during the preparation process of the at least one organic pigment or the at least one pigment dispersant.

11. A pigment preparation made in accordance with the process of claim 7.

12. A pigment preparation made in accordance with the process of claim 9.

13. A process for producing a pigment preparation comprising the step of adding at least one organic pigment to at least one pigment dispersant as claimed in claim 1 during a preparation process for the at least one pigment dispersant to form the pigment presentation.

14. A pigment preparation made in accordance with the process of claim 13.

15. A pigment preparation comprising:
a) at least one organic base pigment and
b) at least one pigment dispersant of the formula (II)

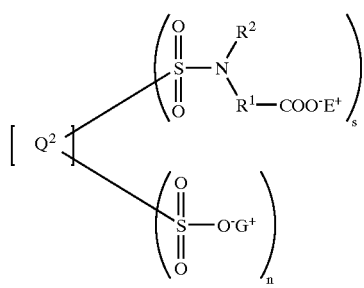
(II)

in which
Q² is a radical of an organic pigment selected from the group consisting of phthalocyanine, azo, benzimidazolone, disazo condensation, perinone, quinacridone, quinacridonequinone, anthanthrone, indanthrone, dioxazine, diketopyrrolopyrrole, indigo, thioindigo, thiazineindigo, isoindoline, isoindolinone, pyranthrone, isoviolanthrone, flavanthrone and anthrapyrimidine pigments; and
s is a number from 1 to 5;
n is a number from 0 to 4;
the sum of s and n being from 1 to 5;
$R^1$ is a divalent branched or unbranched, saturated or unsaturated, aliphatic hydrocarbon radical having 1 to 20 carbon atoms, or a $C_5$–$C_7$-cycloalkylene radical, or a divalent aromatic radical having 1, 2 or 3 aromatic rings, optionally the rings are in fused form or are linked by a bond or a heterocyclic radical having 1, 2 or 3 rings which contains 1, 2, 3 or 4 heteroatoms selected from the group consisting of O, N, S, and combinations thereof; optionally the aliphatic hydrocarbon radical, cycloalkylene, aromatic and heteroaromatic radicals are substituted by 1, 2, 3 or 4 substituents selected from the group consisting of OH, CN, F, Cl, Br, $NO_2$, $CF_3$, $C_1$–$C_6$-alkoxy, S—$C_1$–$C_6$-alkyl, $NHCONH_2$, $NHC(NH)NH_2$, NHCO—$C_1$–$C_6$-alkyl, $C_1$–$C_6$-alkyl, $COOR^{20}$, $CONR^{20}R^{21}$, $NR^{20}R^{21}$, $SO_3R^{20}$ and $SO_2$—$NR^{20}R^{21}$, $R^{20}$ and $R^{21}$ being identical or different and being hydrogen, phenyl or $C_1$–$C_6$-alkyl;
$R^2$ is hydrogen, $HR^1$ or $R^1$—$COO^-E^+$;
$E^+$ and $G^+$ independently of one another are $H^+$ or the equivalent $M^{m+}/m$ of a metal cation $M^{m+}$ from main groups 1 to 5 or transition groups 1 or 2 or 4 to 8 of the periodic system of the chemical elements, m being 1, 2 or 3, an ammonium ion $N^+R^9R^{10}R^{11}R^{12}$,
where the substituents $R^9$, $R^{10}$, $R^{11}$, $R^{12}$, independently of one another are each a hydrogen atom, $C_1$–$C_{30}$-alkyl, $C_2$–$C_{30}$-alkenyl, $C_5$–$C_{30}$-cycloalkyl, phenyl, ($C_1$–$C_6$)-alkyl-phenyl, ($C_1$–$C_4$)-alkylene-phenyl or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$–$C_4$-alkyl or, if k is >1, a combination thereof;
and in which alkyl, alkenyl, cycloalkyl, phenyl or alkylphenyl $R^9$, $R^{10}$, $R^{11}$, and/or $R^{12}$ may be substituted by amino, hydroxyl and/or carboxyl;

or where the substituents $R^9$ and $R^{10}$, together with a quaternary nitrogen atom, form a five- to seven-membered saturated ring system containing, optionally, further heteroatoms selected from the group consisting of O, S, and N;
or where the substituents $R^9$, $R^{10}$ and $R^{11}$ together with a quaternary nitrogen atom, form a five- to seven-membered saturated ring system containing, optionally, further heteroatoms selected from the group consisting of O, S and N; and to which, optionally, additional rings may be fused;
or in which $E^+$ and/or $G^+$ defines an ammonium ion of the formula (Ia)

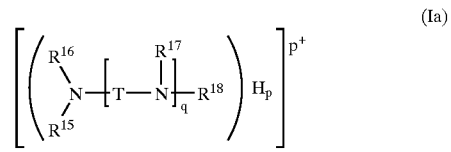
(Ia)

in which
$R^{15}$, $R^{16}$, $R^{17}$ and $R^{18}$ independently of one another are hydrogen or a (poly)alkyleneoxy group of the formula —[CH($R^{80}$)—CH($R^{80}$)—O]$_k$—H, in which k is a number from 1 to 30 and the two radicals $R^{80}$ independently of one another are hydrogen, $C_1$–$C_4$-alkyl or, if k is >1, a combination thereof;
q is a number from 1 to 10;
p is a number from 1 to 5, where p is ≤q+1;
T is a is a branched or unbranched $C_2$–$C_6$-alkylene radical; or in which T, if q is >1, may also be a combination of branched or unbranched $C_2$–$C_6$-alkylene radicals.

16. The pigment preparation of claim 15, wherein the at least one organic base pigment is a perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, indigo, thioindigo, thiazineindigo, isoindoline, isoindolinone, pyranthrone, isoviolanthrone, flavanthrone, anthrapyrimidine pigment, a pigment black; or a mixed crystal or mixture thereof.

17. The pigment preparation of claim 15, consisting essentially of
a) from 50 to 99.9% by weight of a least one organic base pigment,
b) from 0.1 to 25% by weight of at least one pigment dispersant of the formula (II),
c) from 0 to 25% by weight of auxiliaries,
the fractions of the respective components being based on the overall weight of the preparation (100% by weight).

18. A pigmented, natural or synthetic high molecular mass organic material comprising the pigment preparation of claim 15, wherein the natural or synthetic high molecular mass organic material is selected from the group consisting of plastics, resins, varnishes, paints, electrophotographic toners and developers, and inks.

* * * * *